United States Patent
Baligh et al.

(10) Patent No.: US 12,335,085 B2
(45) Date of Patent: Jun. 17, 2025

(54) METHODS, APPARATUS, AND SYSTEMS FOR CONFIGUREABLE MODULATION IN WIRELESS COMMUNICATIONS

(71) Applicant: Huawei Technologies Co., Ltd., Shenzhen (CN)

(72) Inventors: Mohammadhadi Baligh, Ottawa (CA); Javad Abdoli, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/468,364

(22) Filed: Sep. 15, 2023

(65) Prior Publication Data
US 2024/0007339 A1    Jan. 4, 2024

Related U.S. Application Data

(63) Continuation of application No. 16/927,350, filed on Jul. 13, 2020, now abandoned.

(51) Int. Cl.
*H04L 27/34* (2006.01)
*H04L 1/00* (2006.01)
(Continued)

(52) U.S. Cl.
CPC ........ *H04L 27/3488* (2013.01); *H04L 1/0003* (2013.01); *H04L 25/067* (2013.01); *H04L 27/0008* (2013.01); *H04L 27/38* (2013.01)

(58) Field of Classification Search
CPC ... H04L 1/0003; H04L 1/0025; H04L 25/067; H04L 27/0008; H04L 27/3488; H04L 27/38
See application file for complete search history.

(56) References Cited

U.S. PATENT DOCUMENTS 5,150,381 A * 9/1992 Forney, Jr. .......... H04L 27/3422
                                                                714/795
7,076,003 B1    7/2006 Wang
(Continued)

FOREIGN PATENT DOCUMENTS

| CN | 106797365 A | 5/2017 |
| CN | 107079466 A | 8/2017 |

(Continued)

OTHER PUBLICATIONS

Dao, N., et al., "Optimizing Receive Combining Vectors for Multiantenna Users in Multiuser MIMO Precoding", Conference: Proceedings of the Global Communications Conference, 2010. GLOBECOM 2010, Dec. 2010, 5 Pages.
(Continued)

*Primary Examiner* — David B Lugo
(74) *Attorney, Agent, or Firm* — Slater Matsil, LLP

(57) ABSTRACT

The present disclosure relates to configurable modulation in wireless communications. Constellation set signaling and constellation selection signaling are communicated in a wireless communication network. The constellation set signaling is associated with modulation of data using each constellation in a constellation set that includes multiple constellations. The constellation selection signaling is indicative of one of the multiple constellations of the constellation set that is to be used in modulation of data for transmission in the wireless communication network. Data that is modulated using the one of the multiple constellations is also communicated in the wireless communication network.

18 Claims, 9 Drawing Sheets

(51) Int. Cl.
*H04L 25/06* (2006.01)
*H04L 27/00* (2006.01)
*H04L 27/38* (2006.01)

(56) References Cited

U.S. PATENT DOCUMENTS

| | | | |
|---|---|---|---|
| 2007/0077969 | A1 | 4/2007 | Lauer et al. |
| 2013/0091398 | A1 | 4/2013 | Djordjevic et al. |
| 2016/0065401 | A1 | 3/2016 | Jia et al. |
| 2016/0135194 | A1 | 5/2016 | Kim et al. |
| 2016/0352419 | A1 | 12/2016 | Fonseka et al. |
| 2017/0331662 | A1 | 11/2017 | Sun et al. |
| 2018/0192424 | A1 | 7/2018 | Zhang et al. |
| 2020/0374011 | A1* | 11/2020 | Zhou ............... H04B 10/6162 |
| 2021/0112545 | A1 | 4/2021 | Lin et al. |
| 2021/0211247 | A1* | 7/2021 | Wang ............... H04L 1/0009 |

FOREIGN PATENT DOCUMENTS

| | | |
|---|---|---|
| CN | 107222448 A | 9/2017 |
| CN | 110138702 A | 8/2019 |
| CN | 110536428 A | 12/2019 |
| EP | 2541984 A1 | 1/2013 |
| WO | 2004004172 A1 | 1/2004 |
| WO | 2008151308 A1 | 12/2008 |
| WO | 2014009191 A1 | 1/2014 |
| WO | 2015120891 A1 | 8/2015 |

OTHER PUBLICATIONS

Masouros, C., et al., "Exploiting Known Interference as Green Signal Power for Downlink Bearmfoming Optimization", IEEE Transactions on Signal Processing, vol. 63, No. 14, Jul. 15, 2015, 13 Pages.

Maziar, N., et al., "Overview of 5G modulation and waveforms candidates", Journal of Communications and Information Networks, vol. 1, No. 1, Jun. 2016, 17 Pages.

Shea, T., et al., "An Introduction to Deep Learning for the Physical Layer", arXiv:1702.00832v2, [cs.IT] Jul. 11, 2017, 13 Pages.

Sohrabi, F., et al., "Robust Symbol-Level Precoding Via Autoencoder-Bases Deep Learning", ICASSP 2020—2020 IEEE International Conference on Acoustics, Speech and Signal Processing (ICASSP), May 4-8, 2020, 5 Pages.

Vanderweit, D., et al., "Standard + Customized APSK Schemes For Satellite Transmission", SatMagazine, Jul. 2, 2020, 6 Pages.

* cited by examiner

METHODS, APPARATUS, AND SYSTEMS FOR CONFIGUREABLE MODULATION IN WIRELESS COMMUNICATIONS

CROSS-REFERENCE TO RELATED APPLICATIONS

This application is a continuation of U.S. patent application Ser. No. 16/927,350, filed on Jul. 13, 2020, entitled "Methods, Apparatus, and Systems for Configurable Modulation in Wireless Communications," application of which is hereby incorporated herein by reference in its entirety.

TECHNICAL FIELD

This application relates generally to communications in wireless communication networks, and in particular to communications that involve configurable modulation.

BACKGROUND

Current wireless standards use preconfigured Quadrature Amplitude Modulation (QAM) and Phase Shift Keying (PSK) modulations with Grey labelling to convert bits of data streams to complex-valued modulation symbols to be transmitted over different time and/or frequency and/or space resources. These modulation schemes exhibit simple implementations of a modulator and a demodulator. In current systems, the same set of modulation constellations are used in open loop, closed loop, and multi-user Multiple Input Multiple Output (MU-MIMO) applications. In most systems, linear precoders are used with QAM modulated symbols.

The modulation constellation (also known as QAM level) in Long Term Evolution (LTE) and New Radio (NR) systems is signaled in Downlink Control Information (DCI) and combined with the code rate. In LTE and NR, only three regular constellations are used for data channels, including Quadrature PSK (QPSK), 16QAM, and 64QAM. Although these QAM options have some deficiencies such as shaping where the constellation is far from Gaussian (they utilize corner points with high power and higher utilization than what Gaussian modulation would dictate), their simple modulation/demodulation makes them attractive for current communication standards.

SUMMARY

LTE and NR only use a small number of well-defined and standardized constellations, and accordingly the signaling of such constellations is relatively straightforward and simple. In order to support more advanced and configurable constellations, a more sophisticated signaling mechanism is provided. The present disclosure encompasses a solution for signaling associated with constellations, including constellation clouds or irregular constellation points for example, using explicit or implicit methods. A feedback mechanism to support constellation updates is provided in some embodiments.

For example, it may be desirable to use constellations that potentially provide more robustness against mismatches and uncertainties such as Channel State information (CSI), phase noise and non-linearity, better shaping and better Peak to Average Power Ratio (PAPR), improved physical layer security, or other features such as non-Gaussian interference.

One aspect of the present disclosure relates to a method comprising: communicating, in a wireless communication network, constellation set signaling and constellation selection signaling. The constellation set signaling is associated with modulation of data using each constellation in a constellation set that includes multiple constellations. The constellation selection signaling is indicative of one of the multiple constellations of the constellation set that is to be used in modulation of data for transmission in the wireless communication network. Such a method may also include communicating data, modulated using the one of the multiple constellations, in the wireless communication network.

An apparatus according to another aspect of the present disclosure includes: a communication interface; a processor, coupled to the communication interface; and a non-transitory computer readable storage medium, coupled to the processor, storing programming for execution by the processor. The programming includes instructions to communicate signaling and data in a wireless communication network. In particular, the programming includes instructions to communicate constellation set signaling associated with modulation of data using each constellation in a constellation set that includes multiple constellations. The programming may also include instructions to communicate constellation selection signaling indicative of one of the multiple constellations of the constellation set that is to be used in modulation of data for transmission in the wireless communication network. The programming further includes instructions to communicate data, modulated using the one of the multiple constellations, in the wireless communication network.

A computer program product includes a non-transitory computer readable storage medium storing programming. In an embodiment, the programming includes instructions to: communicate, in a wireless communication network, constellation set signaling; communicate constellation selection signaling; and communicate data. The constellation set signaling is associated with modulation of data using each constellation in a constellation set that includes multiple constellations. The constellation selection signaling is indicative of one of the multiple constellations of the constellation set that is to be used in modulation of data for transmission in the wireless communication network. The data is modulated using the one of the multiple constellations, in the wireless communication network.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
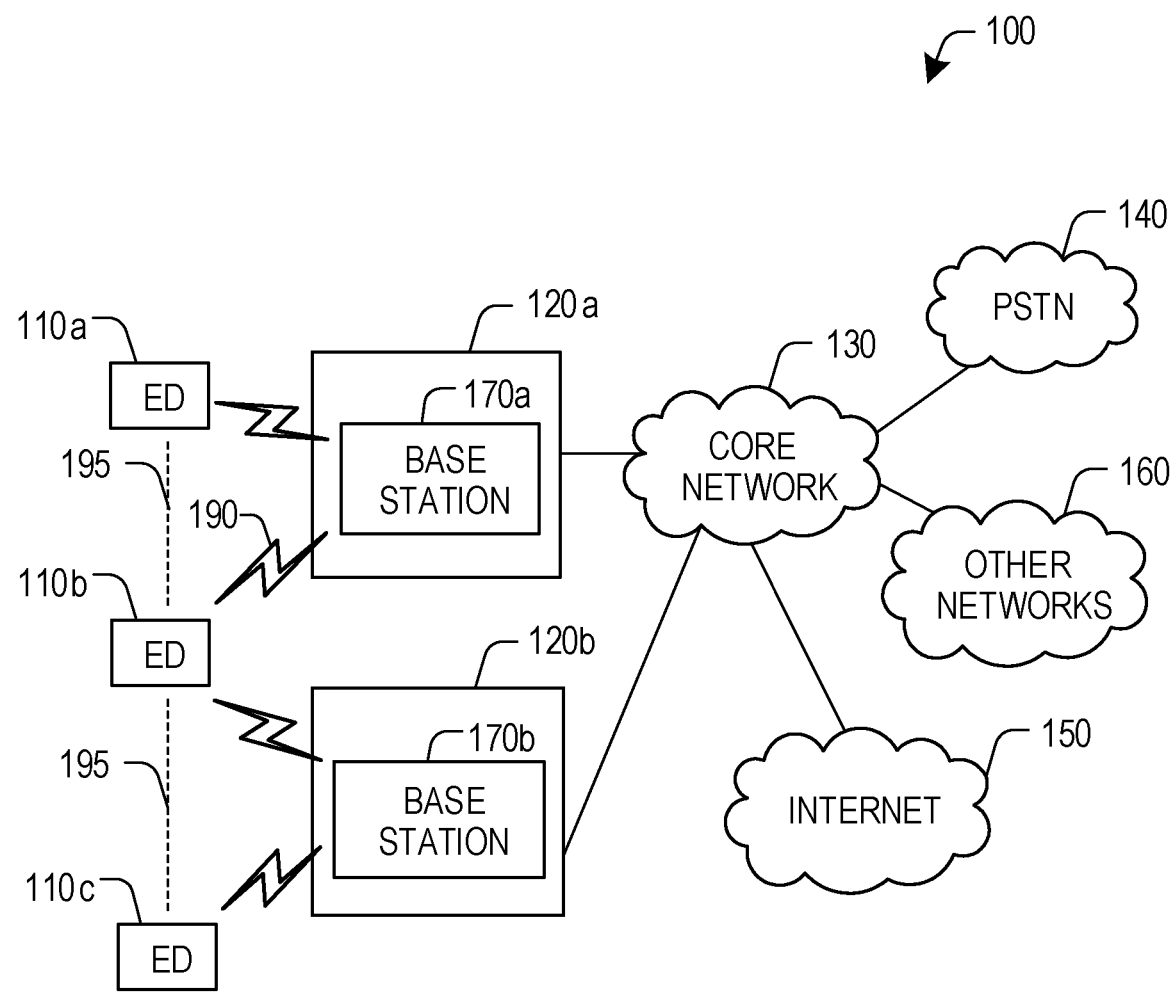
FIG. 1 illustrates an example communication system in which aspects of the present disclosure are implemented in some embodiments.

As noted above, current modulation approaches may be attractive for their simple modulation and demodulation, but such approaches might not be sufficient to meet the needs or targets for such parameters as robustness against mismatches and uncertainties, shaping, PAPR, physical layer security, or other features such as non-Gaussian interference. Frequency and Quadrature Amplitude Modulation (FQAM) may be useful for non-Gaussian interference, and Artificial Intelligence (AI) based modulation constellations may be useful to optimize any of these or criteria, for example.

Modulators and demodulators operate according to a set of bit-to-symbol mapping and demapping rules. The symbol values are commonly represented in a constellation diagram. The term "constellation" typically refers to the constellation diagram (i.e., the symbol values available for mapping to bits). Since a constellation diagram may also further include information about the bit-to-symbol mapping, the "constellation" term is sometimes also used to refer to the mapping and demapping rules, which is also sometimes simply referred to as "modulation". Therefore, "constellation" may be used herein to refer to either, unless specified otherwise.

Symbol Level Precoding (SLP) is a non-linear precoding method that is proposed for MU-MIMO. With channel uncertainty, there are constellation clouds rather than constellation points. Soft/hard decision demodulation for constellation clouds is different from constellation points. Neural networks may optimize the constellation and demodulation procedures. The optimized constellation differs when the number of users, number of antenna elements, channel conditions and uncertainty levels change.

The optimized constellation may thus be a function of one or more underlying criteria, such as channel conditions, number of users, uncertainty level, and possibly others. A large set of constellations could potentially be optimized through offline Neural Network (NN) training or other techniques, for example. Therefore, there is potentially a large set of many different constellations, which can make pre-configuration of a fixed set of constellations and standardization of constellations in a standard specification quite cumbersome.

Moreover, with a fixed set of constellations (e.g., standardized constellations), there is no room for further optimization or updating of a constellation or constellation set based on existing conditions and user experience. Actual uncertainty levels such as CSI at the transmitter (CSIT) mismatch, for example, are not typically considered in optimizations. There is no possibility of retraining an NN and learning actual uncertainties, and instead a model is used for uncertainties.

Constellations for which standardization is not feasible or not desirable may be referred to as "irregular" or "configurable" constellations. Configurable constellations may provide better support for optimization of constellations based on any of various parameters, or selection of a current constellation from larger or more dynamic constellation sets for example.

The present disclosure addresses several issues, including signaling of constellations, feedback related to constellations, transmitter or transmission strategy update, and potentially adding predefined constellations to provide a constellation set or design that is better suited to one or more desired features or parameters.

According to embodiments disclosed herein, a constellation is not restricted to any particular shape or any particular dimension. Regardless of an optimization mechanism that is used to derive a constellation, any of multiple methods may be used in signaling to indicate the constellation that is to be used for modulating data at any time. Embodiments may be applicable to any one or more of downlink (DL), uplink (UL), and sidelink (SL) communications.

In summary, signaling of constellations may be useful to enable constellations that are not directly specified in a standard or otherwise standardized to be used in modulating data for transmission. Such signaling may be, or include, explicit signaling or implicit signaling. For example, a constellation, one or more parameters describing the constellation, and/or receiver behavior may be directly or indirectly signaled. This may include such information as modulation or constellation parameter settings and formulas related to modulation or demodulation. A signaled constellation may be multi-dimensional. There are several options for the "vehicle" or type of the signaling and its content. Signaling associated with constellations, also referred to herein as constellation signaling, can be done in one or more of Radio Resource Control (RRC) signaling, Medium Access Control-Control Element (MAC CE) signaling, and DCI. Signaling type may be chosen depending on the frequency and overhead of the signaling method, for example. RRC is less dynamic and may have less signaling overhead compared to MAC CE, and MAC CE is less dynamic and may have less signaling overhead compared to DCI.

Regarding feedback related to constellations, in some embodiments, a receiver reports a quantity or set of quantities describing the performance associated with use of a constellation. For example, performance may be impacted by the constellation that is used and uncertainties such as CSIT mismatch. Parameters such as one or both of a feedback calculation mechanism and an underlying feedback channel may be signaled to the receiver. For DL constellation feedback, feedback signaling can be done in RRC or Uplink Control Information (UCI), for example.

Transmitter strategy update refers to updating one or more characteristics or parameters of a transmitter strategy. Transmitter strategy may be updated based on one or more of: feedback from a receiver, changing system parameters, and local measurements by the transmitter, for example. Examples of approaches to transmitter strategy update include: (i) signaling to modify a constellation and (ii) no update in the constellation or receiver behavior. Although example approach (ii) does not have a signaling impact, the example approach (i) involves signaling to update a previously used and signaled constellation or receiver demodulation, for example, if the updated transmitter strategy includes such a change.

Even adding predefined constellations to a standard may have an impact on one or both of RRC and DCI signaling, for example.

Each of these aspects of the present disclosure are considered in further detail herein, at least below.

With reference first to FIG. 1, an example communication system 100 in which aspects of the present disclosure are implemented in some embodiments is shown. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a UE, Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may be or include one or more of several well-known devices, such as a Base Transceiver Station (BTS), a Node-B (NodeB), an evolved NodeB (eNodeB), a Home eNodeB, a gNB (next generation NodeB), a Transmission Point (TP), a Transmission Reception Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, µWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations. The base stations of the NR cell may use the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and direct communication links 195 between UEs are represented by dashed lines in FIG. 1. UEs communicate directly with each other over sidelinks, for example. Embodiments disclosed herein are not limited to downlink or uplink communications, and may also or instead be applied to direct device to device communications such as sidelink communications.

Additional details regarding the EDs 110 and the base stations 170 are known to those of skill in the art. As such, these details are omitted here for clarity.

Regarding signaling of constellations, such signaling may be or include explicit signaling or implicit signaling. For explicit signaling, the entity that selects a constellation that is to be used for modulating data for transmission, which is expected to be a network device for DL or UL communications for example, explicitly instructs another entity, such as a UE, about the selected constellation. As an example, information about the complex location of the constellation may be sent. This may include, for example the expected (noiseless, distortionless) receive points, as well as one or more corresponding mapping rules such as a corresponding binary-to-complex mapping. Signaling may assume fixed constellation power, and the received power may be separately signaled, through Demodulation Reference Signal (DMRS) power or separate explicit signaling for example.

In an embodiment, signaling includes constellation set signaling associated with modulation of data using each of multiple constellations in a set of constellations, and constellation selection signaling to select one of those constellations. Although any of various signaling mechanisms may be used, in some embodiments the most suitable mechanism for at least constellation set signaling is RRC. For example, RRC signaling may be used to configure or instruct more than one constellation, and DCI signals the constellation that is selected or chosen for use in modulation of data. Such DCI signaling may involve a new DCI bit field, adding more options to existing DCI bit fields, or re-interpretation of an existing bit DCI field, for example. Another possibility is using RRC signaling to instruct multiple sets of constellations, MAC CE signaling to signal one selected constellation set among those sets, and DCI signaling to signal one selected constellation within the selected constellation set. Other embodiments are also possible.

Content of signaling may also take any of various forms. As an illustrative example, consider signaling to send a 4QAM constellation to a UE. A network device may send to the UE signaling that indicates 4 complex values using RRC signaling, with four (x,y) pairs representing quantized real value pairs and the following mapping:

$$00 \to x_0+j y_0, 01 \to x_1+j y_1, 10 \to x_2+j y_2, 11 \to x_3+j y_3$$

Again, this is an example. Other embodiments are possible.

These explicit signaling examples are illustrative of embodiments that may provide a simple and explicit vehicle for signaling to inform transmitters and/or receivers, such as UEs, about constellations.

Another possible form of explicit constellation signaling involves parameter setting. For example, a communications standard may provide techniques on how to generate constellations or constellation generation may otherwise be specified or configured, and related constellation parameters may then be signaled. A receiver of such signaling, such as a UE, then uses these parameters to explicitly extract expected (noiseless, distortion-less) constellation points, as well as a corresponding binary-to-complex mapping.

Any of various signaling mechanisms can be used, but RRC may be the most suitable mechanism in some embodiments. For example, more than one constellation may be signaled in RRC, and DCI signaling may be used to signal the one constellation that is chosen for use in modulating data. A new DCI bit field, additional options for existing DCI bit fields, or re-interpretation of an existing bit DCI field may be used to enable such signaling through DCI. Another option that is also noted above involves using RRC signaling to instruct multiple sets of constellations, using MAC CE signaling to signal a selected constellation set among the sets, and using DCI to signal one selected constellation within the selected constellation set.

As a parameter setting example, suppose that a formula like the following is specified in a communications standard for 16QAM or otherwise available at a UE:

$$0000 \to 0 + j0$$

$$dec2\,bin(n), n = 1, \ldots, N \to \alpha \exp\left(\frac{j2\pi n}{N}\right)$$

$$dec2\,bin(n), n = N+1, \ldots, 16 \to \beta \exp\left(\frac{j2\pi\left(n+\frac{1}{2}\right)}{15-N}\right)$$

In this example, quantized real parameters $\alpha$ and $\beta$ and integer parameter N may be signaled to the UE using RRC signaling. If the values N=5, $\alpha$=1, $\beta$=2.5 are signaled, then the resulting constellation generated at the UE would be consistent with the example constellation illustrated in FIG. 2.

These parameter setting examples are illustrative of further embodiments that may provide a simple and explicit vehicle for signaling constellations in a wireless communication network, to a UE for example, with much less overhead compared to explicit signaling of all constellation points. Signaling that involves parameter setting, however, may have lower flexibility compared to embodiments in which constellation points are explicitly signaled.

Turning to implicit constellation signaling, constellation signaling associated with modulation of data using a constellation is not limited only to explicit signaling of a constellation. For example, constellation signaling may also or instead include signaling of information that is indicative of one or more features that are related to modulation or demodulation according to a constellation, without necessarily signaling information that defines a constellation or otherwise provides a constellation definition or enables a constellation to be generated by providing a constellation generation method or rule. For example, in an embodiment constellation signaling involves signaling that is indicative of decision regions of a constellation, such as through signaling constellation decision boundaries. As in other embodiments, signaling may assume a fixed constellation power, and the received power may be separately signaled, such as through DMRS power or explicit signaling. For example, a boundary region can be signaled through vertices of the Voronoi region of each point, as follows:

$$00 \rightarrow \{x_0^1 + jy_0^1, \ldots, x_0^M + jy_0^M\}, 01 \rightarrow \{x_1^1 + jy_1^1, \ldots, x_1^M + jy_1^M\},$$

$$10 \rightarrow \{x_2^1 + jy_2^1, \ldots, x_2^M + jy_2^M\}, 11 \rightarrow \{x_3^1 + jy_3^1, \ldots, x_3^M + jy_3^M\}$$

Figure 2:
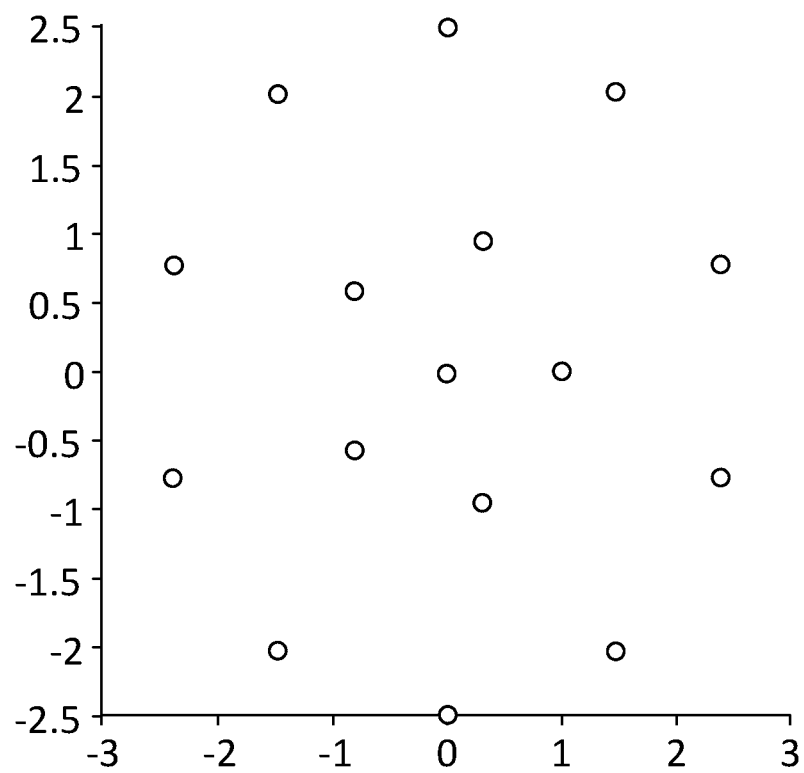
FIG. 2 illustrates an example QAM constellation.
Figure 3:
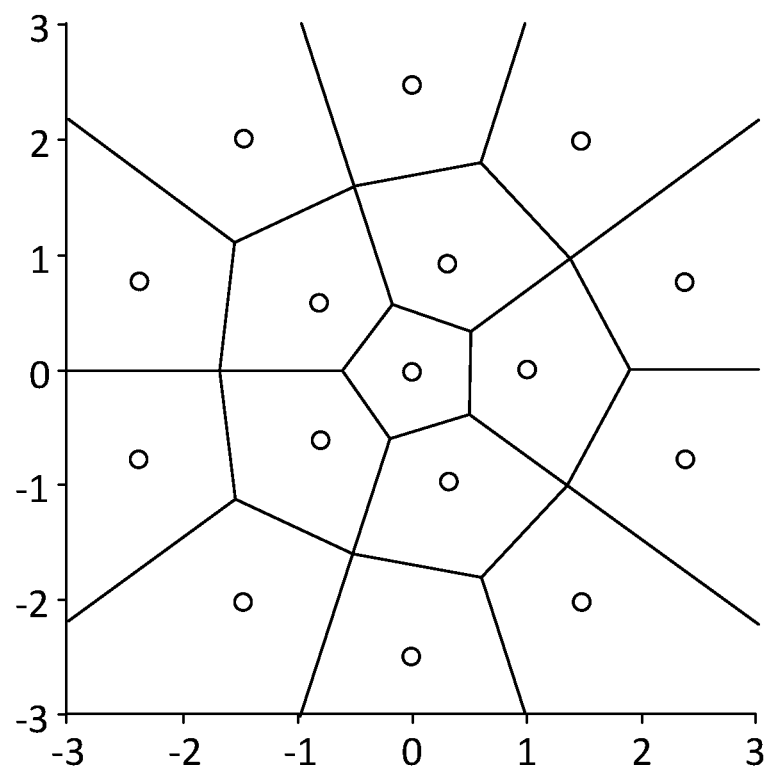
FIG. 3 illustrates decision regions or boundaries of the example QAM constellation in FIG. 2.

For example, the decision regions or boundaries of the constellation in FIG. 2 are as shown in FIG. 3, and may be signaled in some embodiments.

Again, any of various signaling mechanisms can be used, but the most suitable mechanism is RRC in some embodiments. The above examples of RRC signaling, DCI signaling, and MAC CE signaling apply to implicit signaling embodiments as well.

In some scenarios, due to effects such as CSIT uncertainty, a constellation is not strictly a set of a few points but rather a set of constellation clouds. A decision region or boundary implicit signaling approach may be better suited for such scenarios.

Another implicit signaling example relates to implicit constellation signaling through soft demodulation setting. In an embodiment, a constellation is signaled by signaling information associated with a soft decision function of a receiver. For each bit or symbol in a constellation, a soft decision output may be determined based on a received signal with some noise and signal power level. Signaling related to soft decision demodulation may involve representing an LLR calculation by a piecewise linear approximation or function of a received signal, for example.

Figure 4:
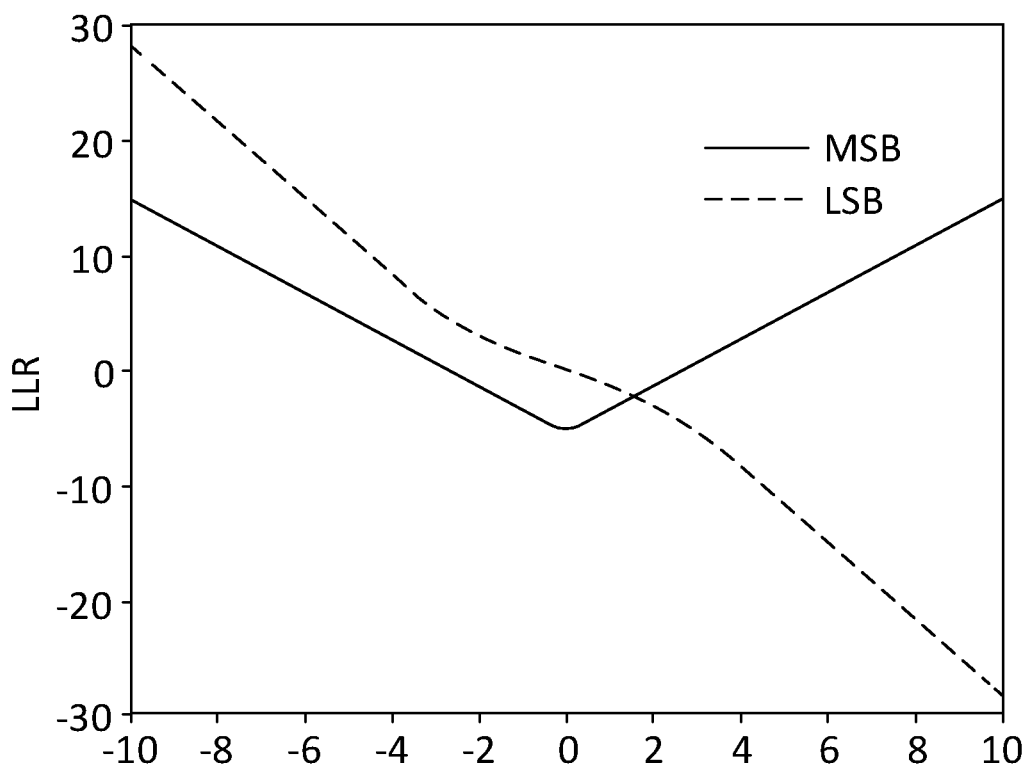
FIG. 4 is a plot illustrating Log Likelihood Ratio (LLR) versus received signal power level for an example of Grey 4-Pulse Amplitude Modulation (PAM) with constellation points $(-4,-1,1,4)$ and $N_0=3$.

As an illustrative example, consider the actual LLR for Grey 4-PAM with constellation points (−4,−1,1,4) in a system impacted by an Additive White Gaussian Noise (AWGN) with the one-sided noise spectral density of $N_0=3$ as shown in FIG. 4, which can be replaced with a piecewise linear approximation.

Any of various signaling mechanisms can be used for such soft demodulation signaling, but again the most suitable mechanism is RRC in some embodiments. The above examples of RRC signaling, DCI signaling, and MAC CE signaling apply to implicit signaling related to soft demodulation.

Implicit signaling related to soft demodulation may be particularly suited for scenarios in which a network device is to control UE behavior, for example.

Some embodiments involve a neural network (NN) based receiver. In such embodiments, a constellation might not be signaled and, instead, the signaling instructs a receiving device, such as a UE, with an NN structure and sets coefficients to perform hard or soft decisions based on a constellation. The receiving device itself need not know the actual constellation, and might not even know the dimension of the constellation. The instructed NN is used with the instructed coefficients to derive hard or soft decisions on constellation points.

As in other embodiments, any of various signaling mechanisms can be used for NN based receiver signaling, with the most suitable mechanism being RRC in some embodiments. The above examples of RRC signaling, DCI signaling, and MAC CE signaling apply to implicit signaling related to NNs.

NN based receiver signaling may be particularly suited for scenarios in which receiver behavior is to be controlled even more closely than in the case of implicit signaling related to soft demodulation, and a receiving device is capable of neural network computation.

It should be noted that some embodiments may involve different signaling approaches. For example, constellation signaling may include signaling related to multiple constellations, but not all of those constellations need necessarily be implicitly signaled by signaling NN structure and coefficients. More generally, multiple types of constellation signaling may be used. This may apply to not only implicit signaling related to NN based receivers, but also or instead to other types of signaling as well.

Some embodiments may support feedback related to constellations. A receiving device, such as a UE in DL communications, may estimate distortions and transmit signaling indicative of feedback. Such feedback signaling may be transmitted to a transmitting device from which modulated data was received, or to a different device. A UE may receive data from another UE and transmit feedback to a network device for example.

Feedback may be used to improve the overall performance, such as by updating one or more constellations or otherwise compensating for one or more effects such as distortion without changing a constellation. Estimation for generating feedback may happen on the symbol level or code level. For example, a receiving device may decode a message and reconstruct the intended noise/distortion-free signal.

Non-limiting examples of distortions that may be estimated and feedback that may be transmitted by a receiving device include the following:

feedback of estimated noise level or distortion level around constellation points (per constellation point, for a group of points, or for the entire set of points in a constellation);

feedback of only estimated detrimental or "hurtful" noise level or distortion level, which may involve ignoring noise that moves a received signal away from a boundary (especially for the constellation points for which boundary regions are unbounded and the noise which moves the received point even further from the boundaries) for example;

feedback of estimated rotation of a constellation;

feedback of estimated bias of a constellation;

feedback of estimated scaling mismatch of a constellation;

feedback of estimated linearity mismatch of a constellation, such as uneven scaling of received constellation points.

Feedback is not necessarily restricted to any particular signaling options. In some embodiments, UCI in Physical Uplink Control Channel (PUCCH), UCI in Physical Uplink Shared Channel (PUSCH), or RRC is used for feedback signaling.

Feedback signaling related to noise or distortion may be especially useful to enable compensation for errors caused by such issues or effects as uncertainties, mismatches, etc.

Another type of feedback signaling relates to a gradient of noise or distortion. A receiving device may estimate conditions such as distortions associated with modulation and transmit feedback signaling that is indicative of a function representing such distortions. Such a function may be specified in a communications standard, instructed by a network device, or otherwise signaled to or available at the receiving device. That function may be used to represent the gradient of a target function such as any one or more of the following, for example: cross-entropy, weighted cross-entropy, symbol error, bit error, mutual information, and capacity.

The knowledge provided by feedback may be used to improve overall performance, by updating one or more constellations or compensating for distortion without changing a constellation for example. Estimation for gradient feedback may be performed on the symbol level or code level, as in other embodiments. Signaling options noted elsewhere herein for other feedback embodiments also apply to gradient feedback embodiments, including UCI in PUCCH/PUSCH or RRC, for example.

Several illustrative and non-limiting examples of functions that may be used in gradient feedback are provided below.

In an embodiment, gradient feedback involves feedback of a gradient at a receive antenna. For example, a receiving device may evaluate the gradient at one or more of its antenna ports. This may be particularly useful if a transmitter wants to further train a neural network at the transmitter, which may involve using CSIT to back propagate the gradient.

Another embodiment involves feedback of a gradient at one or more transmitter antenna ports. A receiving device may apply its knowledge of a channel from logical transmit antenna ports to receive antennas to perform back propagation.

Feedback of an error represented by a receive NN is another option. In an embodiment, a receiving device reports an error at its output NN and back propagation calculations are made at the transmitter, with the transmitter's knowledge of the receiver NN structure and coefficients and CSIT.

Consider a more detailed example of a procedure for UE feedback using a gradient. In this example:

X is a transmit vector at antenna ports;
$Y=f(H, X, n)=HX+n$ is a received vector;
H, n represent noise;
m is the intended message;
$\hat{m}$ is the estimated message;
$H_R$, $H_T$ represent the channel known at the transmitting device and the receiving device.

For the purpose of this example, the following functions are defined:

$X=g(m, H_T)$ is a transmission function;
$\hat{m}=h(Y, H_R)$ is a demodulator decision function;
$0=\text{objective}(m, \hat{m})$ is an objective function such as cross-entropy.

In this example, the feedback represents a gradient of 0 with respect to:

function h if the feedback is shown at receive antennas;
function $h(f(\cdot))$ if the feedback is shown at transmit antenna ports;
steps of function h if the steps of this function are known to the transmitting device, such as when demodulation is designed using an NN that has been instructed by the transmitting device.

A potential benefit of gradient feedback is to allow a network device to train an NN on the fly. With knowledge of the gradient at the receiving device, whether at the output of the NN, the input of the NN, the receive antennas, or transmitter antenna ports, the network device can potentially further optimize the NN.

Regarding transmitter strategy update, any of several options are possible. One option involves modifying one or more constellations. A constellation may be modified in response to a feedback or because of any other change or condition in a communication network.

Illustrative and non-limiting examples of constellation modification include the following:

modifying an explicitly signaled constellation;
modifying a subset of one or more parameter values used for extracting a constellation;
modifying one or more decision boundaries for implicit signaling of a constellation; modifying a soft decision function for implicit signaling of a constellation;
modifying one or more coefficients in a receiver or demodulation NN.

Signaling related to modification of a constellation may involve any of various signaling mechanisms. For modifications to an explicitly signaled constellation, parameter value(s) for extracting a constellation, decision boundaries, or a soft decision function for example, MAC CE may be more suitable but DCI/RRC are also possible. For NN-based embodiments, RRC may be more suitable due to potentially larger overhead of signaling related to NN coefficients.

With this type of transmitter strategy update, a small change in communication network operating parameters or conditions that results in a small change in a constellation can be signaled without a large overhead.

In some embodiments, transmission strategy may be modified without changing receiving device behavior. In such embodiments, no constellation is modified from a receiving device perspective, and therefore receiving device behavior is not changed. However, a transmitting device may update an aspect of transmission strategy to compensate for distortion and/or other conditions in a way that does not require a change of receiving device behavior. For example, a transmitting device may apply processing or other techniques to compensate for distortions without affecting how data is demodulated by a receiving device.

Transmission strategy may be modified in response to feedback or based on other criteria, such as a change in communication network operating parameters or conditions.

With this type of transmission device-centric strategy modification mechanism, the transmitting device itself can compensate for distortion or causes of distortion without changing a constellation or receiving device behavior, which can potentially be implemented with no additional signaling overhead or impact associated with the transmission strategy modification.

Signaling is applicable to various embodiments disclosed herein. Examples include, but are in no way limited to, the following:

RRC signaling for any one or more of: configuring, reconfiguring, modifying, enabling, and disabling a modulation or constellation;
MAC CE signaling for any one or more of: instructing, updating, modifying, enabling, and disabling an already configured or instructed modulation or constellation;
DCI signaling for any one or more of: indicating a scheduled modulation or constellation (possibly together with other information such as Forward Error Correction (FEC) code rate), enabling a modulation or constellation, and disabling a modulation or constellation. For example, a new DCI bit field may be added to signal a modulation or constellation, an existing DCI bit field may be re-interpreted to signal the modulation or constellation, or the size of an existing DCI bit field related to modulation, such as an MCS bit field, may be changed to accommodate signaling of a new modulation or constellation.

Several illustrative and non-limiting examples of signaling are described below, with reference to FIGS. 5 to 9.

These examples relate to embodiments that provide mechanisms for initial signaling and modification of constellations.

Figure 5:
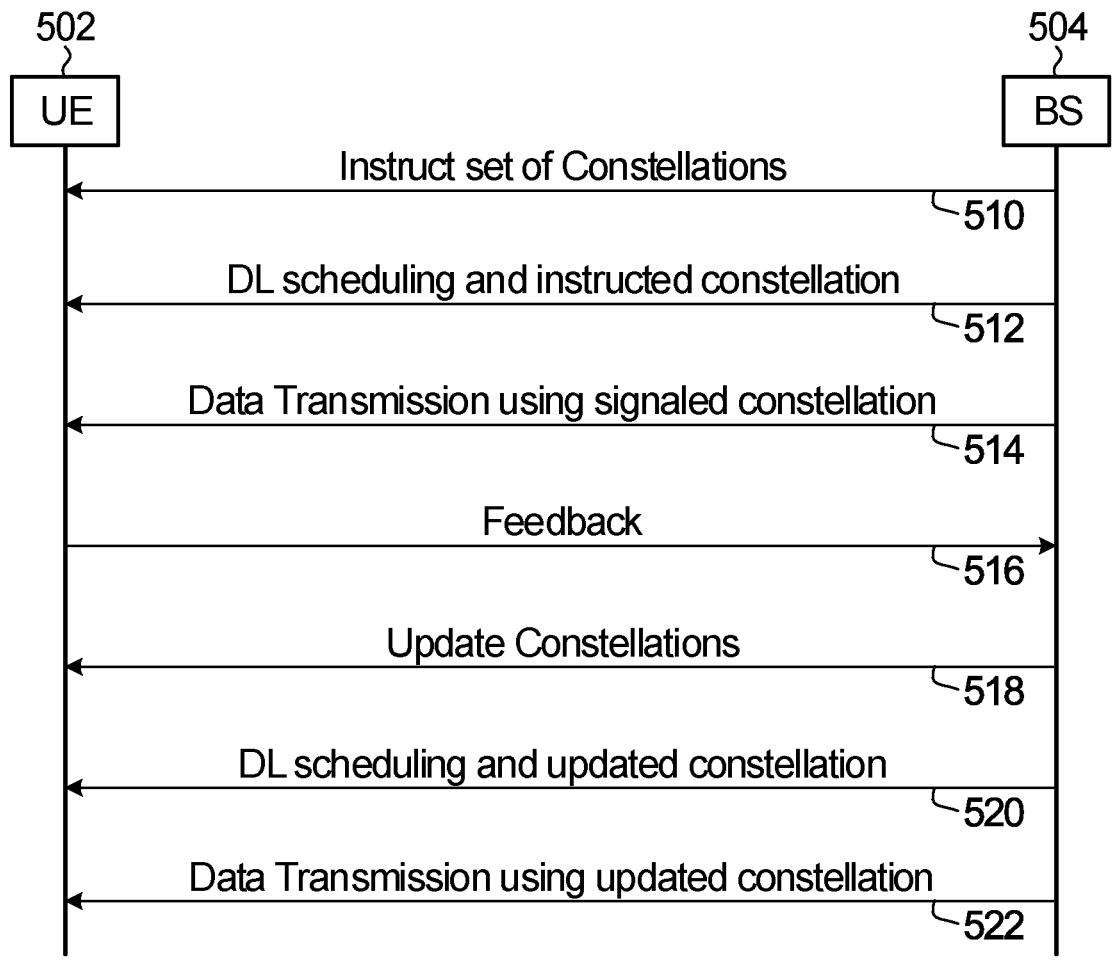
FIG. 5 is a signal flow diagram illustrating an example of signaling related to downlink communications.

FIG. 5 is a signal flow diagram illustrating an example of signaling related to downlink communications. Example signaling vehicles for signaling shown in FIG. 5 are provided elsewhere herein, and such signaling may be delivered using other signaling mechanisms in other embodiments.

Constellation set signaling is associated with modulation of data using each constellation in a constellation set that includes multiple constellations. An example of constellation set signaling is shown at 510 in FIG. 5, and is transmitted to a UE 502 by a network device, shown by way of example as a BS 504. 512 in FIG. 5 illustrates an example of constellation selection signaling indicative of one of the multiple constellations of the constellation set that is to be used in modulation of data for transmission in the wireless communication network. The constellation selection signaling is also transmitted to the UE 502 by the BS 504 in FIG. 5.

Data transmission to transmit data that is modulated using the selected constellation, signaled at 512, is illustrated in FIG. 5 at 514. As noted above, FIG. 5 relates to downlink communications, and therefore the data transmission at 514 is from the BS 504 to the UE 502.

Some embodiments support feedback from a receiver, as shown by way of example at 516. Transmission strategy may then be updated based on received feedback, and in the example shown the transmission strategy update involves updating one or more constellations. Further signaling indicative of a change in modulation of data, shown by way of example in FIG. 5 at 518 to update constellations, is transmitted from the BS 504 to the UE 502, and further selection signaling may also be communicated between the BS and the UE as shown by way of example at 520. Transmission of data modulated using an updated constellation is illustrated at 522.

Although FIG. 5 illustrates only one occurrence of each type of signaling, in general each type of signaling may be communicated between a UE and a BS once or more than once.

A new or updated constellation, or more generally a change in transmitter strategy, may be applicable to only a subset of data communication in some embodiments. As an example, communications using fall back mode, or scheduling command in CORESET 0 or using PDCCH format 1-0, may always use a specific constellation or constellation set.

Figure 6:
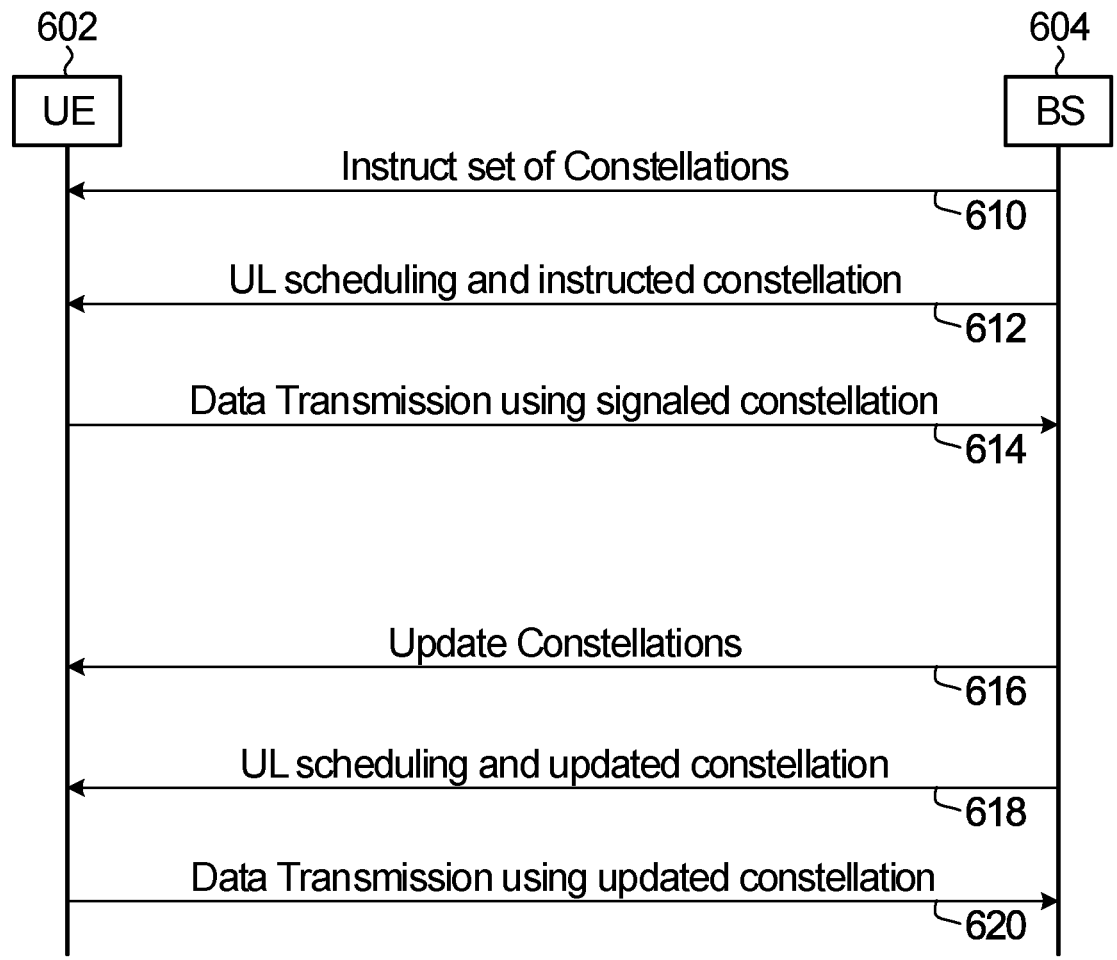
FIG. 6 is a signal flow diagram illustrating an example of signaling related to uplink communications.

FIG. 6 is a signal flow diagram illustrating an example of signaling related to uplink communications. Example signaling vehicles for signaling shown in FIG. 6 are provided elsewhere herein, and such signaling may be delivered using other signaling mechanisms in other embodiments.

Signaling between the UE 602 and the BS 604 in FIG. 6 is substantially similar to the signaling in FIG. 5. Constellation set signaling at 610 and constellation selection signaling at 612 are transmitted from the BS 604 to the UE 602, but in the case of uplink communications the data transmission at 614 is from the UE to the BS.

Although receiver feedback from the UE 502 to the BS 504 is shown in FIG. 5, no such feedback is illustrated in FIG. 6. The BS 604 is the receiver of the data transmission at 614. The BS 604 may therefore measure or otherwise determine conditions related to the selected constellation and update one or more constellations and/or other aspects of transmission strategy based on those condition(s). This is also illustrative of the fact that transmitter strategy updates need not always involve feedback.

The signaling at 616, 618, 620 is substantially similar to the signaling at 518, 520, 522 in FIG. 5, with the exception that the data transmission at 620 is from the UE 602 to the BS 604.

As in FIG. 5, in FIG. 6 each type of signaling may be communicated between a UE and a BS once or more than once, and a new or updated constellation, or more generally a change in transmitter strategy, may be applicable to only a subset of data communication in some embodiments. As an example on this latter point, communications using fall back mode, or scheduling command in CORESET 0 or using PDCCH format 0-0, may always use a specific constellation or constellation set. It should also be noted that uplink and downlink constellation sets and/or constellations that are selected for use at any time, may be different.

Embodiments related to direct UE-to-UE communications are also possible.

Figure 7:
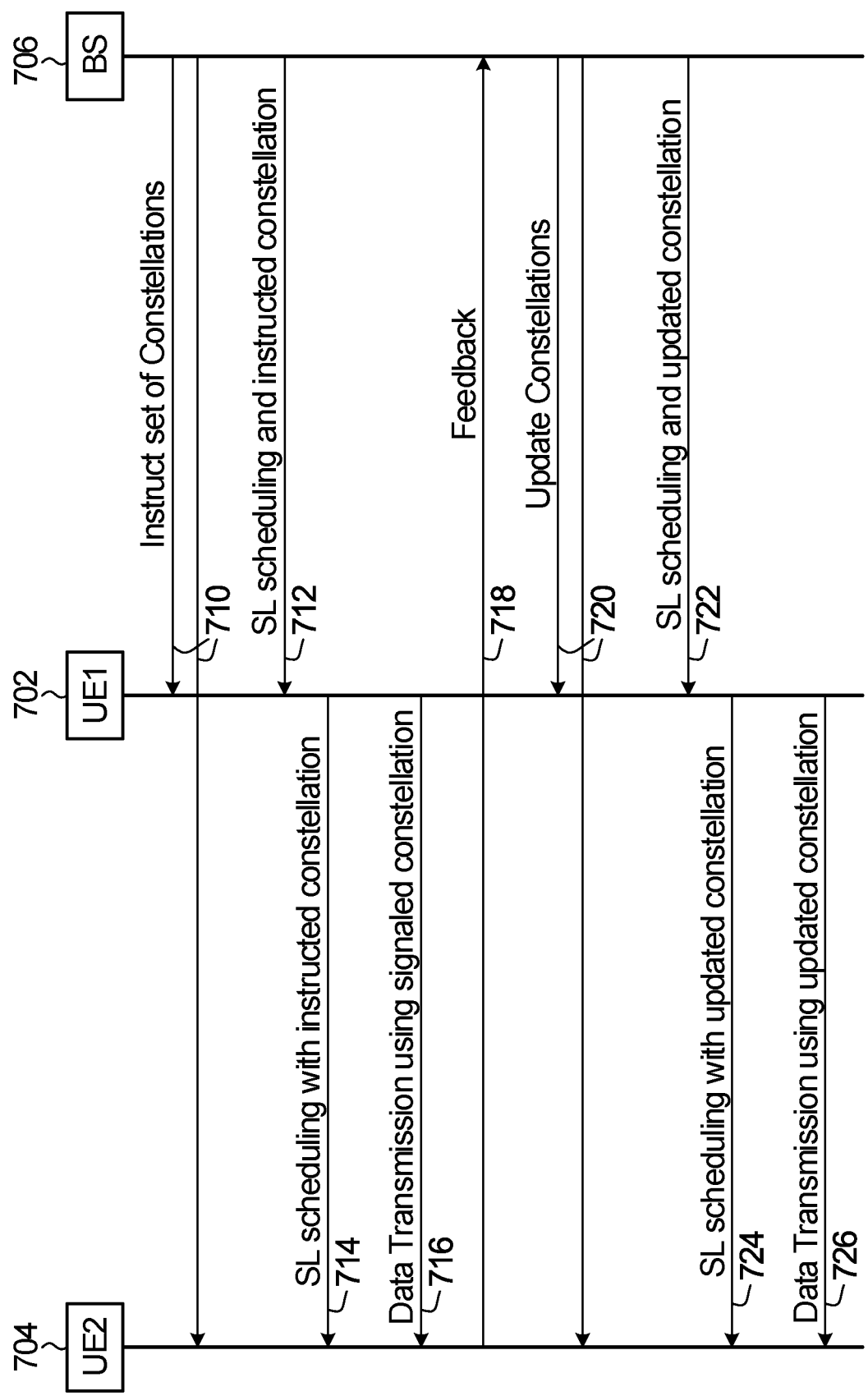
FIG. 7 is a signal flow diagram illustrating an example of signaling related to fully network-controlled direct UE-to-UE communications.

FIG. 7 is a signal flow diagram illustrating an example of signaling related to fully network-controlled direct UE-to-UE communications, over a sidelink for example. In FIG. 7, the network fully controls the sidelink.

The signaling 710 between each UE1 702, UE2 704 and the BS 706 in FIG. 7 illustrates an example scenario in which constellation set signaling is transmitted multiple times. In the example shown, constellation selection signaling at 712 is transmitted from the BS 706 to UE1 702, and from UE1 702 to UE2 704 at 714. The data transmission at 716 is from UE1 702 to UE 2 704 in this example, but may also or instead be in the opposite direction.

For the direction of data transmission shown at 716, UE2 704 is the receiver, and in some embodiments UE2 transmits feedback to the BS 706 as shown at 718. The BS 706 may update one or more constellations or otherwise update transmission strategy based on the feedback, and transmit further signaling to UE1 702 and UE2 704. Constellation selection signaling is also transmitted by the BS 706 at 720 to UE1 702, which in turn transmits further constellation selection signaling at 722 to UE2 704. Data transmission using an updated constellation is shown by way of example at 726.

FIG. 7 is an example, and variations including at least those noted above for FIGS. 5 and 6 are possible.

Figure 8:
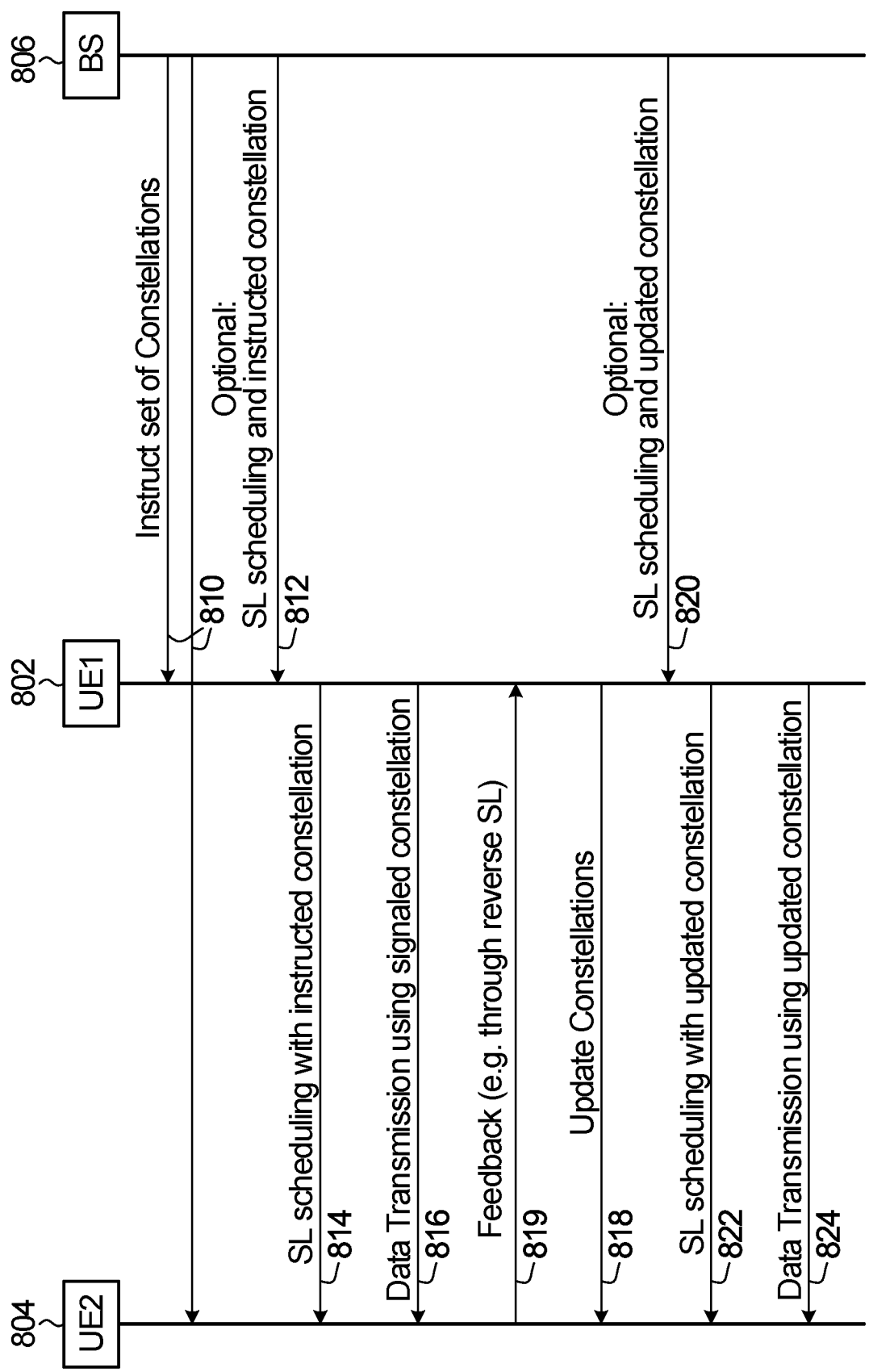
FIG. 8 is a signal flow diagram illustrating an example of signaling related to network-initiated direct UE-to-UE communications with autonomous UE modification.

FIG. 8 is a signal flow diagram illustrating an example of signaling related to network-initiated direct UE-to-UE communications with autonomous UE transmission strategy update or modification. In FIG. 8, a network device in the form of a BS 806 in the example shown initializes sidelink communications for example, but the UEs 802, 804 may update one or more constellations or otherwise update transmission strategy themselves.

Network initiation of communications is illustrated in FIG. 8 by constellation set signaling at 810. As in FIG. 7, constellation set signaling is transmitted multiple times at 810 in FIG. 8. Constellation selection signaling may also be transmitted by the BS 806 at 812, but is shown in FIG. 8 as being optional. Constellation selection signaling at 814 is transmitted from UE1 802 to UE2 804. The data transmission at 816 is from UE1 802 to UE2 804 in this example, but may also or instead be in the opposite direction.

UE2 804 is the receiver in FIG. 8, and may transmit feedback to UE1 802 at 819. In this example UE1 802 may update one or more constellations or otherwise update transmission strategy based on the feedback, and transmit further signaling to UE2 804 at 818. Constellation selection signaling for selection of a constellation may be transmitted to UE1 802 in some embodiments, and is shown in FIG. 8 as being optional. At 822, UE1 802 transmits constellation selection signaling to UE2 804, and data transmission using an updated constellation is shown byway of example at 826.

FIG. 8 is an example, and variations including at least those noted above for FIGS. 5 to 7 are possible.

Figure 9:
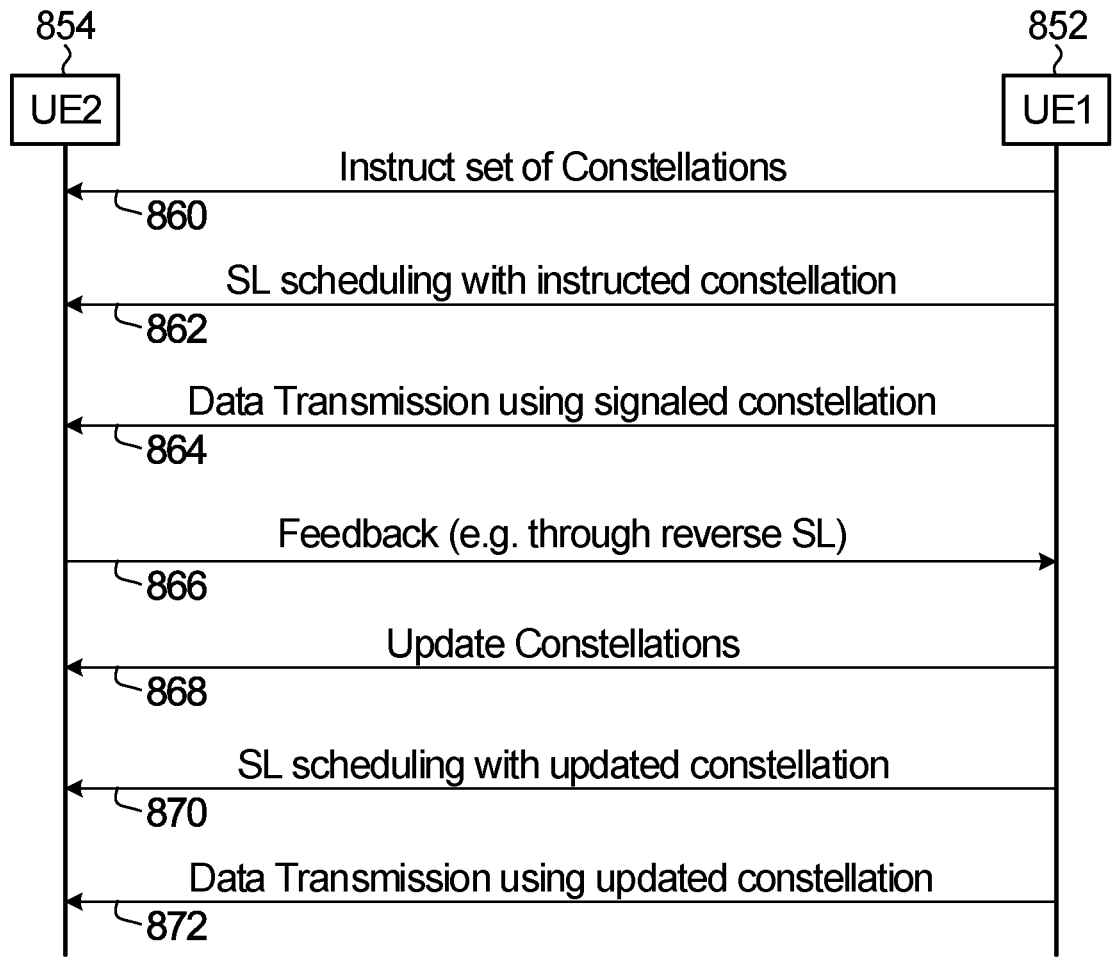
FIG. 9 is a signal flow diagram illustrating an example of signaling related to direct UE-to-UE communications with no network involvement.

FIG. 9 is a signal flow diagram illustrating an example of signaling related to direct UE-to-UE communications with no network involvement.

Constellation set signaling at 860, constellation selection signaling at 862, a data transmission at 864, optionally feedback at 866, further signaling at 868, additional constellation selection signaling at 870, and a further data transmission 872 using an updated constellation are communicated between UE1 852 and UE2 854. Variations including at least those noted above for FIGS. 5 to 8 are possible.

In addition, FIGS. 7 to 9 relate to UE-to-UE communications, for which there may be other signaling options, depending on the entity that controls the sidelink for example. In some embodiments, a network device can instruct both UEs in a sidelink to use a certain new modulation. In this case, Sidelink Control Information (SCI) may be used to carry information similar to DCI in downlink communications, while RRC signaling from the network device to both UEs may be used for longer term settings. Signaling may be communicated between the UEs themselves in other embodiments, via SCI for example, and there is no network involvement.

FIGS. 5 to 9 are illustrative of various embodiments, including a method that involves communicating, in a wireless communication network, constellation set signaling, communicating constellation selection signaling, and communicating data. The constellation set signaling is associated with modulation of data using each constellation in a constellation set that includes multiple constellations. The constellation selection signaling is indicative of one of the multiple constellations of the constellation set that is to be used in modulation of data for transmission in the wireless communication network. Data modulated using the one of the multiple constellations is communicated in the wireless communication network.

These communicating features may involve transmitting signaling or data or receiving signaling or data. With reference to FIG. 5, for example, the BS 504 is communicating signaling by transmitting constellation set signaling and constellation selection signaling to the UE 502 at 510, 512. The UE 502 is also communicating signaling, but by receiving the constellation set signaling and the constellation selection signaling from the BS 504 at 510, 512. Similarly, regarding data, the BS 504 is communicating data modulated using the selected constellation transmitting data at 522, whereas the UE 502 is communicating data by receiving the data from the BS. Communicating signaling and data by the UE 602 and the BS 604 in FIG. 6 are similar to FIG. 5, but in FIG. 6 the UE 602 is communicating data by transmitting data at 614 and the BS 604 is communicating data by receiving the data. UE2 704, UE2 804, and UE 854 in FIGS. 7 to 9 illustrate that communicating signaling and data may involve receiving signaling and data. UE1 852 in FIG. 9 illustrates that communicating signaling and data may involve transmitting signaling and data. Other examples of communicating signaling and data are also disclosed herein.

Constellation set signaling may be or include explicit signaling that specifies information associated with one or more of the multiple constellations. This information may be indicative of any one or more of: constellation points and mappings for the one or more of the multiple constellations; and parameter setting for the one or more of the multiple constellations.

In some embodiments, the constellation set signaling is or includes implicit signaling that specifies information associated with demodulation of data that has been modulated using one or more of the multiple constellations. In implicit signaling embodiments, this information may be indicative of any one or more of: decision boundaries for the one or more of the multiple constellations; a soft decision function for the one or more of the multiple constellations; and a neural network structure and coefficients for the demodulation of data.

Various signaling options for constellation set signaling are disclosed herein, and include RRC signaling, MAC CE signaling, and DCI. Other options include Uplink Control Information (UCI) for possible embodiments in which constellation set signaling is transmitted in the uplink direction, and SCI for possible embodiments in which constellation set signaling is transmitted between UEs.

As noted above, communicating data may involve receiving the data. Some embodiments also involve transmitting, to a transmitter from which the data is received, feedback associated with the data, as shown in FIGS. 5 and 7 to 9, for example.

From a transmitter perspective, communicating data involves transmitting data to a receiver, and some embodiments also involve receiving, from the receiver, feedback associated with the data.

Feedback may be indicative of any one or more of: noise; distortion; a gradient of noise; and a gradient of distortion. Other types of feedback may also or instead be transmitted and/or received.

Options for feedback signaling include any one or more of: RRC signaling; MAC CE signaling; UCI; and SCI. Another possible option is DCI for embodiments in which feedback is transmitted in the downlink direction.

Transmitter or transmission strategy may be updated, based on feedback in some embodiments. Consider, for example, a receiver perspective in which communicating data involve receiving the data modulated using the selected one of the multiple constellations. Some embodiments involve, in the event of a transmitter strategy update, receiving further signaling indicative of a change in modulation of data for transmission in the wireless communication network, and receiving data modulated according to the change in modulation. Feedback-based transmitter strategy updating may also involve transmitting, to a transmitter from which the data is received, feedback associated with the data, in which case the change in modulation may be or include a change that was made at the transmitter based on the feedback.

From a transmitter perspective, a method may involve receiving, from a receiver to which data is transmitted, feedback associated with the transmitted data. A change in modulation may then be a change that was made at the transmitter based on the feedback. Communicating data after a change in modulation may involve transmitting data modulated according to the change in modulation of data for transmission in the wireless communication network. A transmitter strategy update may be made at the transmitter itself, and accordingly the transmitter need not necessarily receive signaling indicative of a change in modulation before transmitting data that is modulated according to the change. A transmitter that makes a change in transmitter strategy, however, may transmit further signaling indicative of the change in modulation.

These examples are illustrative of behaviors during and after a change in modulation. Other embodiments are possible. For example, a device that was previously receiving data before a change may also or instead transmit data after a change.

A change in modulation may involve, for example, a change in any one or more of: a constellation of the multiple constellations; constellation points and mappings for a constellation of the multiple constellations; a parameter setting for a constellation of the multiple constellations; a decision boundary for a constellation of the multiple constellations; a soft decision function for a constellation of the multiple constellations; a neural network structure for demodulation of data; and one or more neural network coefficients for demodulation of data.

Signaling indicative of a change in modulation may be or include, for example any one or more of: RRC signaling; MAC CE signaling; DCI; and SCI. UCI may also or instead be used for such signaling in some embodiments.

Regarding possible addition of predefined constellations, this technique might be useful, for example, to provide a constellation set that is better suited to one or more desired features or parameters. One or more new constellations may be added to a standard or otherwise specified or standardized. This can be using one or more lookup tables, one or more formulas, one or more expressions, or a combination of those.

Embodiments are described above primarily in the context of example methods. Other embodiments are also possible.

Figure 10A:
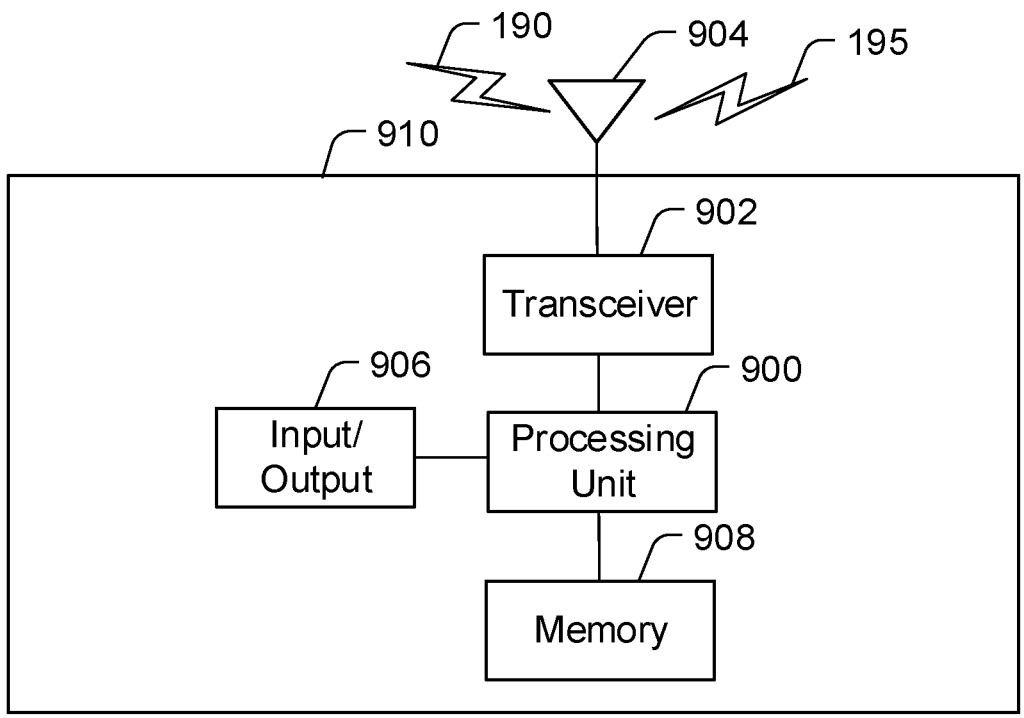
FIGS. 10A and 10B are block diagrams illustrating example devices that may implement the methods and teachings according to this disclosure.
Figure 10B:
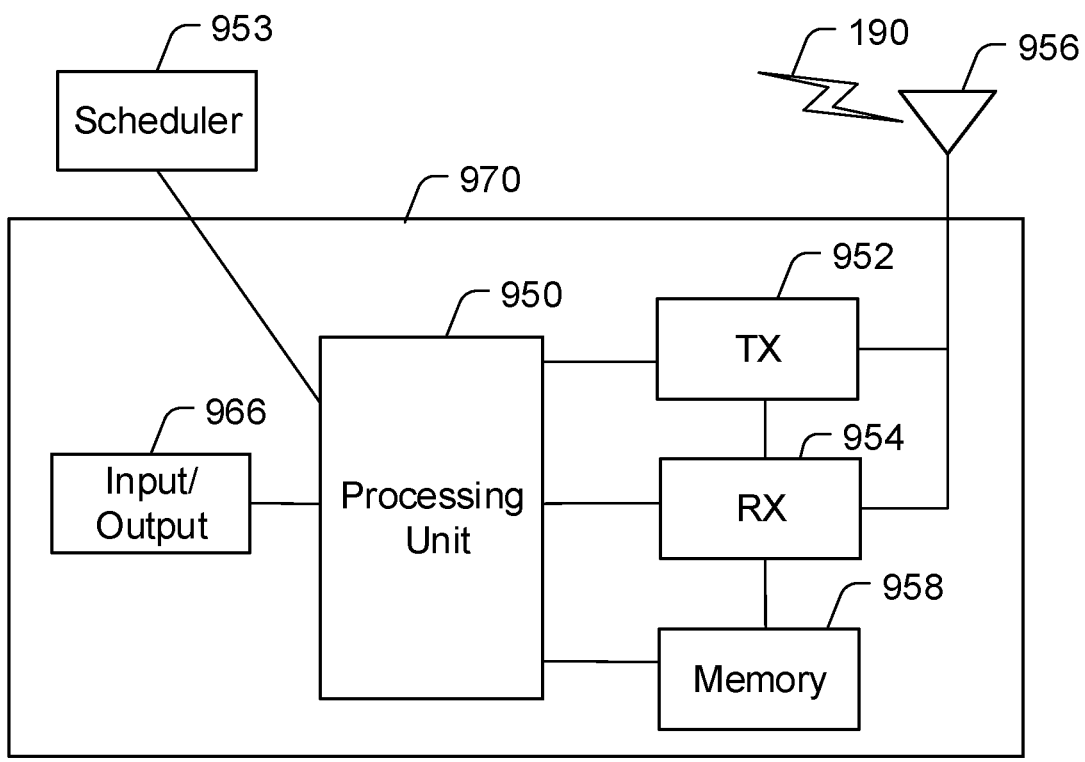

See, for example, FIGS. 10A and 10B which illustrate example devices that may implement the methods and teachings according to this disclosure.

FIG. 10A illustrates an example ED 910, and FIG. 10B illustrates an example base station 970. These components could be used in the system 100 (FIG. 1) or in any other suitable system.

As shown in FIG. 10A, the ED 910 includes at least one processing unit 900. The processing unit 900 implements various processing operations of the ED 910. For example, the processing unit 900 could perform signal coding, data processing, power control, input processing, output processing, or any other functionality enabling the ED 910 to operate in a communication system. The processing unit 900 may also be configured to implement some or all of the functionality or embodiments described in more detail herein. Each processing unit 900 includes any suitable processing or computing device configured to perform one or more operations. Each processing unit 900 could, for example, include a microprocessor, microcontroller, digital signal processor, field programmable gate array, or application specific integrated circuit.

The ED 910 also includes at least one transceiver 902. The transceiver 902 is configured to modulate data or other content for transmission by at least one antenna or NIC (Network Interface Controller) 904. The transceiver 902 is also configured to demodulate data or other content received by the at least one antenna 904. Each transceiver 902 includes any suitable structure for generating signals for wireless transmission and/or processing signals received wirelessly or by wire. Each antenna 904 includes any suitable structure for transmitting and/or receiving wireless signals. One or multiple transceivers 902 could be used in the ED 910, and one or multiple antennas 904 could be used in the ED 910. Although shown as a single functional unit, a transceiver 902 could be implemented using at least one transmitter and at least one separate receiver.

The ED 910 further includes one or more input/output devices 906 or interfaces. The input/output devices 906 facilitate interaction with a user or other devices (network communications) in the network. Each input/output device 906 includes any suitable structure for providing information to or receiving/providing information from a user, such as a speaker, microphone, keypad, keyboard, display, or touch screen, including network interface communications.

In addition, the ED 910 includes at least one memory 908. The memory 908 stores instructions and data used, generated, or collected by the ED 910. For example, the memory 908 could store software instructions or modules configured to implement some or all of the functionality or embodiments described above and that are executed by the processing unit(s) 900. Each memory 908 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 970 includes at least one processing unit 950, at least one transmitter 952, at least one receiver 954, one or more antennas 956, at least one memory 958, and one or more input/output devices or interfaces 966. A transceiver, not shown, may be used instead of the transmitter 952 and receiver 954. A scheduler 953 may be coupled to the processing unit 950. The scheduler 953 may be included within or operated separately from the base station 970. The processing unit 950 implements various processing operations of the base station 970, such as signal coding, data processing, power control, input processing, output processing, or any other functionality. The processing unit 950 can also be configured to implement some or all of the functionality or embodiments described in more detail herein. Each processing unit 950 includes any suitable processing or computing device configured to perform one or more operations. Each processing unit 950 could, for example, include a microprocessor, microcontroller, digital signal processor, field programmable gate array, or application specific integrated circuit.

Each transmitter 952 includes any suitable structure for generating signals for wireless transmission to one or more EDs or other devices. Each receiver 954 includes any suitable structure for processing signals received wirelessly or by wire from one or more EDs or other devices. Although shown as separate components, at least one transmitter 952 and at least one receiver 954 could be combined into a transceiver. Each antenna 956 includes any suitable structure for transmitting, receiving, or both transmitting and receiving wireless signals. While a common antenna 956 is shown here as being coupled to both the transmitter 952 and the receiver 954, one or more antennas 956 could be coupled to the transmitter(s) 952, and one or more separate antennas 956 could be coupled to the receiver(s) 954. Each memory 958 includes any suitable volatile and/or non-volatile storage and retrieval device(s) such as those described above in connection to the ED 910. The memory 958 stores instructions and data used, generated, or collected by the base station 970. For example, the memory 958 could store software instructions or modules configured to implement some or all of the functionality or embodiments described herein and that are executed by the processing unit(s) 950.

Each input/output device 966 facilitates interaction with a user or other devices (network communications) in the network. Each input/output device 966 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 908 and the memory 958, for example, could include one or more physical memory devices. Solid-state memory devices such as a Flash memory device could be implemented. Memory devices with movable or even removable storage media could also or instead be implemented.

FIG. 10A and FIG. 10B illustrate examples of a UE and a network device, respectively, in which embodiments could be implemented. More generally, an apparatus may include a processor and a non-transitory computer readable storage medium, such as the processing unit 900, 950 and memory 908, 958 in FIG. 10A or FIG. 10B. Such an apparatus may be a UE. Another example of an apparatus is network equipment, which may be a gNB, a TRP, a base station, or any other type of network device or equipment referenced herein. Other components, such as a communication interface to which the processor is coupled, may also be provided. Elements 902, 904, 952, 954, 956 in FIGS. 10A and 10B are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the programming includes instructions to, or to cause a processor to, communicate, in a wireless communication network, constellation set signaling associated with modulation of data using each constellation in a constellation set that comprises multiple constellations; communicate constellation selection signaling indicative of one of the multiple constellations of the constellation set that is to be used in modulation of data for transmission in the wireless communication network; and communicate data, modulated using the one of the multiple constellations, in the wireless communication network.

Some embodiments include any one or more of the following features, in any of various combinations:
- the constellation set signaling is or includes explicit signaling that specifies information associated with one or more of the multiple constellations;
- the information associated with the one or more of the multiple constellations is indicative of any one or more of: constellation points and mappings for the one or more of the multiple constellations; and parameter setting for the one or more of the multiple constellations;
- the constellation set signaling is or includes implicit signaling that specifies information associated with demodulation of data that has been modulated using one or more of the multiple constellations;
- the information associated with demodulation of data is indicative of any one or more of: decision boundaries for the one or more of the multiple constellations; a soft decision function for the one or more of the multiple constellations; and a neural network structure and coefficients for the demodulation of data;
- the constellation set signaling is or includes RRC signaling;
- the constellation set signaling also or instead includes MAC CE signaling;
- the constellation selection signaling is or includes DCI;
- the instructions include instructions to, or to cause a processor to, communicate data by receiving the data modulated using the one of the multiple constellations, and further include instructions to, or to cause a processor to: transmit, to a transmitter from which the data is received, feedback associated with the data;
- the instructions include instructions to, or to cause a processor to, or to cause a processor to, communicate data by transmitting, to a receiver, the data modulated using the one of the multiple constellations, and further include instructions to, or to cause a processor to: receive, from the receiver, feedback associated with the data;
- the feedback is indicative of any one or more of: noise; distortion; a gradient of noise; and a gradient of distortion;
- the feedback comprises any one or more of: RRC signaling; MAC CE signaling; UCI; and SCI;
- in another embodiment in which the instructions include instructions to, or to cause a processor to, communicate data by receiving the data modulated using the one of the multiple constellations, the instructions may further include instructions to, or to cause a processor to, receive further signaling indicative of a change in modulation of data for transmission in the wireless communication network; and receive data modulated according to the change in modulation;
- from a transmitter perspective, the instructions may include instructions to, or to cause a processor to, communicate data by transmitting the data modulated using the one of the multiple constellations, and the instructions may further include instructions to, or to cause a processor to, transmit data modulated according to the change in modulation in the wireless communication network, and/or transmit the further signaling indicative of the change in modulation;

in an embodiment in which the instructions include instructions to, or to cause a processor to, transmit feedback associated with the data to a transmitter from which the data is received or receive feedback associated with the data from a receiver to which data is transmitted, the change in modulation may be or include a change that was made at the transmitter based on the feedback;

the change in modulation is or includes a change in any one or more of: a constellation of the multiple constellations; constellation points and mappings for a constellation of the multiple constellations; a parameter setting for a constellation of the multiple constellations; a decision boundary for a constellation of the multiple constellations; a soft decision function for a constellation of the multiple constellations; a neural network structure for demodulation of data; and one or more neural network coefficients for demodulation of data;

the further signaling is or includes any one or more of: RRC signaling; MAC CE signaling; DCI; and SCI.

Other features that could be implemented in apparatus embodiments or in non-transitory computer readable storage medium embodiments could be or become apparent, for example, from the method embodiments disclosed herein. Features disclosed in the context of any embodiment are not necessarily exclusive to that particular embodiment, and may also or instead be applied to other embodiments.

Features disclosed herein encompass, among others: constellation signaling, including explicit or implicit signaling; feedback for the modulation or constellation; modification of a constellation; and signaling that is involved in these solutions.

Some embodiments may be targeted toward 6G deployments and applications, for which capabilities at UEs and networks may be much higher than in other network deployments and shifts in transmission/reception chains may be more feasible.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

It should also be appreciated that the present disclosure is not restricted to any particular constellation definition or mapping rule. For example, a current wireless standard defines a single constellation type or mapping rule based on Grey mapping. It is possible that different constellation types or mapping rules, or more than one constellation type or mapping rule, may be applied to generate modulated data. Illustrative and non-limiting examples include regular constellations with non-Grey mapping, irregular mapping, one or more mapping rules for non-linear modulation, or one or more mapping rules generated by AI.

What is claimed is:

1. A method comprising:
communicating, in a wireless communication network, signaling indicative of a decision region for a constellation associated with modulation of data, the signaling indicating vertices of a boundary of the decision region;

communicating, in the wireless communication network, the data modulated according to the decision region;

communicating feedback related to the constellation, the feedback including per-constellation-point estimated noise levels or per-constellation-point estimated distortion levels around constellation points in the constellation, wherein the per-constellation-point estimated noise levels or the per-constellation-point estimated distortion levels are at a symbol level or a code level;

communicating one or more updated constellations based on the feedback related to the constellation; and communicating second data modulated using the one or more updated constellations.

2. The method of claim 1, wherein the per-constellation-point estimated noise levels or the per-constellation-point estimated distortion levels are at the code level.

3. The method of claim 1, wherein the communicating the data comprises:
receiving the data modulated using the constellation, the communicating the feedback comprising:
transmitting, to a transmitter from which the data is received, the feedback associated with the data.

4. The method of claim 3, wherein the feedback is indicative of one or more of:
noise, distortion, a gradient of the noise, or a gradient of the distortion.

5. The method of claim 1, wherein the communicating the data comprises:
transmitting, to a receiver, the data modulated using the constellation, the communicating the feedback comprising:
receiving, from the receiver, the feedback associated with the data.

6. The method of claim 5, wherein the feedback is indicative of one or more of: noise, distortion, a gradient of the noise, or a gradient of the distortion.

7. The method of claim 1, wherein the signaling indicative of the decision region for the constellation comprises signaling indicative of a decision boundary for the constellation.

8. The method of claim 7, wherein the signaling indicative of the decision boundary for the constellation comprises vertices of a Voronoi region of each constellation point of the constellation.

9. The method of claim 1, the signaling being medium access control-control element (MAC CE) signaling.

10. An apparatus comprising:
at least one processor; and
a non-transitory computer readable storage medium storing programming, the programming including instructions that, when executed by the at least one processor, cause the apparatus to perform operations including:
communicating, in a wireless communication network, signaling indicative of a decision region for a constellation associated with modulation of data, the signaling indicating vertices of a boundary of the decision region;
communicating, in the wireless communication network, the data modulated according to the decision region;
communicating feedback related to the constellation, the feedback including per-constellation-point estimated noise levels or per-constellation-point estimated distortion levels around constellation points in the constellation, wherein the per-constellation-point estimated noise levels or the per-constellation-point estimated distortion levels are at a symbol level or a code level;
communicating one or more updated constellations based on the feedback related to the constellation; and
communicating second data modulated using the one or more updated constellations.

11. The apparatus of claim 10, wherein the per-constellation-point estimated noise levels or the per-constellation-point estimated distortion levels are at the code level.

12. The apparatus of claim 10, wherein the communicating the data comprises:
receiving the data modulated using the constellation, the communicating the feedback comprising:
transmitting, to a transmitter from which the data is received, the feedback associated with the data.

13. The apparatus of claim 12, wherein the feedback is indicative of one or more of: noise, distortion, a gradient of the noise, or a gradient of the distortion.

14. The apparatus of claim 10, wherein the communicating the data comprises:
transmitting, to a receiver, the data modulated using the constellation, the communicating the feedback comprising:
receiving, from the receiver, the feedback associated with the data.

15. The apparatus of claim 14, wherein the feedback is indicative of one or more of: noise, distortion, a gradient of the noise, or a gradient of the distortion.

16. The apparatus of claim 10, wherein the signaling indicative of the decision region for the constellation comprises signaling indicative of a decision boundary for the constellation.

17. The apparatus of claim 16, wherein the signaling indicative of the decision boundary for the constellation comprises vertices of a Voronoi region of each constellation point of the constellation.

18. A non-transitory computer-readable medium having instructions stored thereon that, when executed by an apparatus, cause the apparatus to perform operations, the operations comprising:
communicating, in a wireless communication network, signaling indicative of a decision region for a constellation associated with modulation of data, the signaling indicating vertices of a boundary of the decision region;
communicating, in the wireless communication network, the data modulated according to the decision region;
communicating feedback related to the constellation, the feedback including per-constellation-point estimated noise levels or per-constellation-point estimated distortion levels around constellation points in the constellation, wherein the per-constellation-point estimated noise levels or the per-constellation-point estimated distortion levels are at a symbol level or a code level;
communicating one or more updated constellations based on the feedback related to the constellation; and
communicating second data modulated using the one or more updated constellations.

* * * * *